May 12, 1925. 1,537,879
A. L. PUTNAM
PNEUMATIC TREADED VEHICLE WHEEL
Filed Aug. 13, 1920
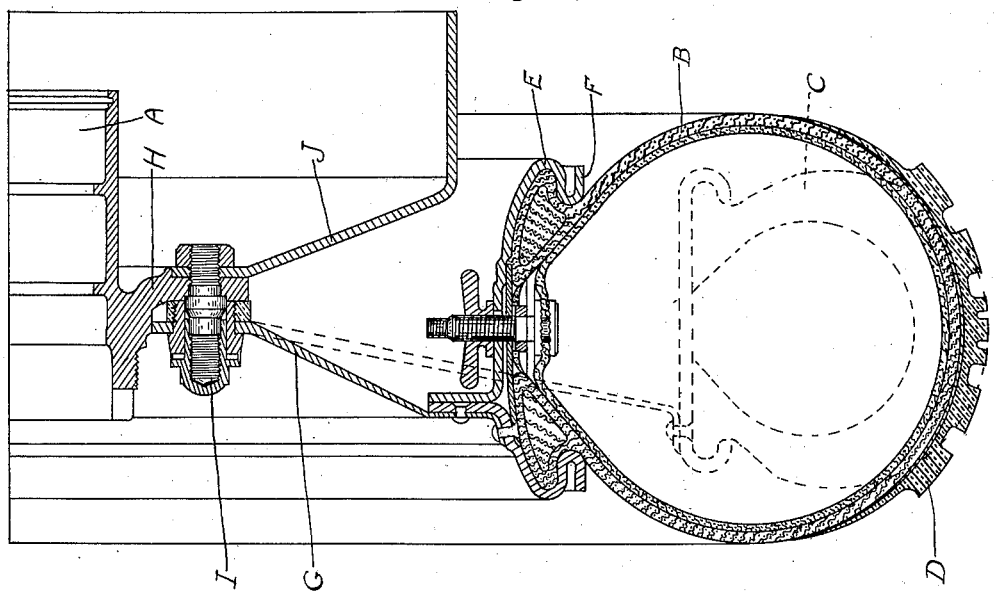
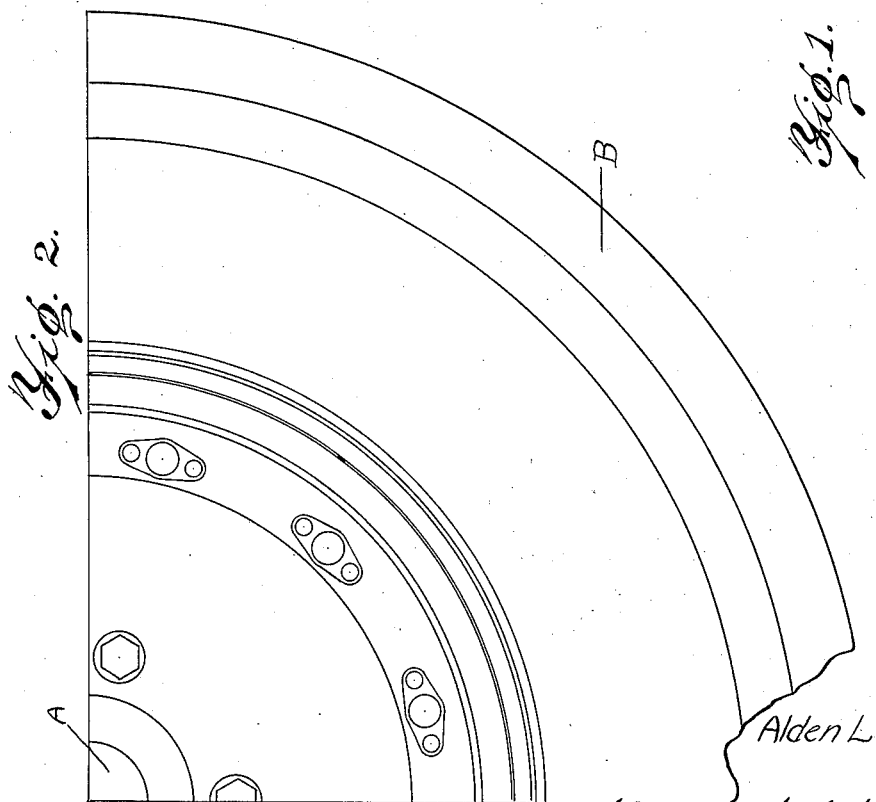
Inventor
Alden L Putnam

Patented May 12, 1925.

1,537,879

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF DELAWARE.

PNEUMATIC-TREADED VEHICLE WHEEL.

Application filed August 13, 1920. Serial No. 403,192.

*To all whom it may concern:*

Be it known that I, ALDEN L. PUTNAM, a citizen of the United States of America, residing at Detroit, in the county of Wayne and State of Michigan, have invented certain new and useful Improvements in Pneumatic-Treaded Vehicle Wheels, of which the following is a specification, reference being had therein to the accompanying drawings.

The invention relates to vehicle wheels of the type which are provided with pneumatic tires and it is the object of the invention to obtain a reorganized construction of pneumatic treaded wheel in which various advantages are secured, as hereinafter set forth.

In the present state of the art pneumatic tires for vehicles have been standardized, so that the size of the tire circumferentially and in cross-section is proportioned to the load which it is designed to carry. For small loads the cross-section is small, the inflation pressure low and the walls of the tube relatively thin. For greater loads the dimensions and pressures are greater, but there is a certain ratio which remains substantially constant in all constructions. This ratio is such that for the greater loads, such as with wheels of heavy pleasure cars or trucks, the pneumatic pressure is very high and the thickness of the fabric walls correspondingly great. The increased thickness of the fabric interferes greatly with its flexibility and increases the friction incident to use. If it were possible to decrease the thickness of the wall while still sustaining the same load, shocks would be absorbed with greater facility and the life of the tire would be increased.

There are practical reasons that tend to limit the size of tires. One of these is that it is undesirable to greatly increase the diameter of the tread. Another is that the decreasing of the diameter of the wheel body beyond a certain limit is equally undesirable, and third, there are certain difficulties in the construction of the tire which arise from too great a difference between the external and internal dimensions circumferentially thereof. In view of these conditions and limitations the practice in tire building has been standardized as above stated.

It is the central object of the present invention to carry the loads with a lower pneumatic pressure and at the same time to avoid the objections and difficulties which generally arise where the inflation pressure is below standard. This I have accomplished by a complete reorganization of the wheel increasing the cross-sectional diameter of the tire relative to the circumferential diameter thereof, the load it is designed to carry, and the pressure of inflation, and correspondingly decreasing the diameter of the wheel body and the thickness of the fabric walls of the tire. Thus the increase in the cross-sectional diameter will carry a given load with less inflation pressure. The decrease in inflation pressure will diminish the thickness of the fabric wall required for retaining the pressure. The thinner fabric walls will absorb road shocks with greater facility and will decrease the wear and destruction of the fabric due to working. The decrease in the diameter of the wheel body will permit mounting thereon of the tire of larger cross-section without increasing the circumferential length or diameter of the tread.

While my improvement is in one sense a change in proportion of parts, the changes are nevertheless such as to produce radically different effects and resulting advantages. It is obvious that no precise ratio is necessary to these changed effects and advantages, but I have found that a change of ratio such as from five to eight in increase of the cross-sectional diameter of the tire, the circumference and diameter of the tread remaining the same, will produce a marked advantage. Also, that a further increase in the ratio is even more advantageous.

In the drawings:

Figure 1 is a cross-section of my improved pneumatic treaded vehicle wheel, showing in dotted lines its relation to a wheel for a corresponding load constructed in accordance with standard practice;

Figure 2 is a side elevation thereof.

A is a wheel hub which may be of any standard construction, B is the pneumatic tire, the cross-sectional diameter of which is in the ratio of five to three with reference to a standard construction of tire designed to carry the same load, this being indicated in dotted lines at C. As also indicated, the thickness of the tread D of the tire B is less than the thickness of the tire C and the side walls of the case are correspondingly decreased in thickness. E is a tire-engaging rim which may be of any suitable construction, but as shown, is formed to receive a clincher tire and is provided with the return-bent flange F for engaging the grooves in the beads and for preventing rim cutting.

As indicated in Figure 1, the increase in the cross-sectional diameter of the tire diminishes the diameter of the rim and the space between the same and the hub. Any suitable wheel body may extend between the hub and rim, but as shown this is a dished disk G. This disk may be demountably secured to a flange H of the hub by means of clamping bolts I and the brake drum J may also be secured to the hub by these bolts. The rim is also preferably materially increased in width to engage the tire of increased cross-sectional area.

The construction as described may be used as a replacement for any wheel of the same diameter of tread and designed to carry the same load and, in use, the inflation pressure is diminished so as to produce both easier riding qualities and a decrease in wear and destruction of the fabric.

What I claim as my invention is:

1. A pneumatic tire of normally circular cross-section and designed to carry a pre-determined normal load at a substantially reduced inflation pressure, modified from standard practice for the same load by a substantial increase in cross-sectional area and a substantial decrease in ratio of wall thickness to cross-sectional diameter.

2. A pneumatic tire of normally circular cross-section and designed to carry a pre-petermined normal load at a substantially reduced inflation pressure, modified from standard practice for the same load by an increase of at least 50% in cross-sectional area and a substantial decrease in the ratio of wall thickness to cross-sectional diameter.

3. A pneumatic tired vehicle wheel designed to carry a predetermined load at substantially below standard inflation pressure and with a materially decreased total weight of tire and wheel body; modified from standard practice by a substantial increase in cross-sectional diameter of the tire with a decrease in ratio of wall thickness thereto and a substantial decrease in the ratio of wheel body to tire in both radial dimension and weight.

In testimony whereof I affix my signature.

ALDEN L. PUTNAM.